United States Patent
Komanoya (10) Patent No.: US 12,551,877 B2
(45) Date of Patent: Feb. 17, 2026

(54) EXHAUST GAS PURIFICATION CATALYST

(71) Applicant: Mitsui Mining & Smelting Co., Ltd., Tokyo (JP)

(72) Inventor: Tasuku Komanoya, Saitama (JP)

(73) Assignee: Mitsui Kinzoku Company, Limited, Tokyo (JP)

( * ) Notice: Subject to any disclaimer, the term of this patent is extended or adjusted under 35 U.S.C. 154(b) by 513 days.

(21) Appl. No.: 18/008,860

(22) PCT Filed: Jun. 17, 2021

(86) PCT No.: PCT/JP2021/022974
§ 371 (c)(1),
(2) Date: Dec. 7, 2022

(87) PCT Pub. No.: WO2021/261363
PCT Pub. Date: Dec. 30, 2021

(65) Prior Publication Data
US 2023/0294084 A1    Sep. 21, 2023

(30) Foreign Application Priority Data

Jun. 22, 2020    (JP) ................. 2020-107189

(51) Int. Cl.
*B01J 33/00*    (2006.01)
*B01D 53/94*    (2006.01)
(Continued)

(52) U.S. Cl.
CPC .......... *B01J 33/00* (2013.01); *B01D 53/9413* (2013.01); *B01J 23/63* (2013.01); *B01J 35/56* (2024.01);
(Continued)

(58) Field of Classification Search
CPC . B01J 33/00; B01J 35/56; B01J 23/63; B01D 53/9413; F01N 3/2825
See application file for complete search history.

(56) References Cited

U.S. PATENT DOCUMENTS

2005/0164879 A1    7/2005    Chen
2021/0180500 A1*   6/2021    Huennekes ............. B01J 23/44

FOREIGN PATENT DOCUMENTS

JP    2008-516768 A    5/2008
JP    2015-66516 A     4/2015
(Continued)

OTHER PUBLICATIONS

International Search Report (ISR) dated Jul. 20, 2021 filed in PCT/JP2021/022974.

*Primary Examiner* — James A Fiorito
(74) *Attorney, Agent, or Firm* — RANKIN, HILL & CLARK LLP (57) ABSTRACT

Provided is an exhaust gas purification catalyst that suppresses phosphorus poisoning and improves long-term durability. The exhaust gas purification catalyst includes a phosphorus collection layer and a catalyst layer containing at least one precious metal element $M^p$ selected from the group consisting of Pt, Pd, and Rh, wherein the phosphorus collection layer is arranged on the upper layer side and/or the upstream side with respect to the catalyst layer; the phosphorus collection layer contains a composite oxide containing Al and an alkaline earth metal element $M^\alpha$ that includes Mg and that may include at least one selected from the group consisting of Ca, Sr, and Ba, and having a cubic spinel structure belonging to the space group Fd-3m; the composite oxide has a $M^\alpha$/Al molar ratio in a range of 0.02 or more and 0.60 or less; and the composite oxide has a peak derived from the cubic spinel structure belonging to the space group Fd-3m of the composite oxide between a diffraction angle (Continued)

$2\theta x_{M^aO}$ that is a position of a peak derived from an alkaline earth metal oxide $M^aO$ and a diffraction angle $2\theta x_{Al_2O_3}$ that is a position of a peak derived from an aluminum oxide $Al_2O_3$ in an X-ray diffraction spectrum.

6 Claims, 5 Drawing Sheets

(51) Int. Cl.
*B01J 23/63* (2006.01)
*B01J 35/56* (2024.01)
*B01J 35/70* (2024.01)
*F01N 3/28* (2006.01)
*B01J 35/34* (2024.01)

(52) U.S. Cl.
CPC ............ *B01J 35/70* (2024.01); *F01N 3/2825* (2013.01); *B01D 2255/1021* (2013.01); *B01D 2255/1025* (2013.01); *B01D 2255/2092* (2013.01); *B01D 2255/407* (2013.01); *B01D 2255/90* (2013.01); *B01D 2257/404* (2013.01); *B01J 35/34* (2024.01); *B01J 2235/00* (2024.01); *B01J 2235/15* (2024.01); *B01J 2235/30* (2024.01); *F01N 2330/06* (2013.01); *F01N 2370/02* (2013.01)

(56) References Cited

FOREIGN PATENT DOCUMENTS

| | | |
|---|---|---|
| JP | 2015-188881 A | 11/2015 |
| JP | 2018-171615 A | 11/2018 |
| WO | 2006/044974 A1 | 4/2006 |

* cited by examiner

EXHAUST GAS PURIFICATION CATALYST

TECHNICAL FIELD

The present invention relates to an exhaust gas purification catalyst including a phosphorus collection layer.

BACKGROUND ART

Exhaust gases emitted from internal combustion engines such as gasoline engines and diesel engines of automatic four-wheel vehicles and motorcycles (also referred to as saddle-riding-type vehicles) contain harmful components such as hydrocarbons (HC) caused by unburned fuel, carbon monoxide (CO) caused by incomplete combustion, and nitrogen oxides (NOx) caused by excessive combustion temperature. In order to treat the exhaust gases emitted from the internal combustion engines, exhaust gas purification compositions used for exhaust gas purification catalysts have been used. For example, hydrocarbons (HC) contained in the exhaust gases are oxidized and converted into water and carbon dioxide for purification. Carbon monoxide (CO) is oxidized and converted into carbon dioxide for purification. Nitrogen oxides (NOX) are reduced and converted into nitrogen for purification.

The exhaust gas purification catalysts have been required to be further improved in exhaust gas purification performance, for example, in maintaining exhaust gas purification performance over a long period of time. For example, in order to improve the long-term durability of exhaust gas purification catalysts and to decrease poisoning of a nitrogen oxide (NOx) trapping layer by sulfur oxide (SOx), Patent Literature 1 discloses a layered catalyst composite including a sulfur oxide (SOx) absorption layer containing MgO, hydrotalcite, and the like as sulfur oxide (SOx) absorption components in front of or above a nitrogen oxide (NOx) absorption layer.

CITATION LIST

Patent Literature

Patent Literature 1: International Publication No. 2006/044974

SUMMARY OF THE INVENTION

Problem to be Solved by the Invention

Exhaust gases contain, for example, phosphorus compounds derived from lubricant additives. When the exhaust gases come into contact with an exhaust gas purification catalyst, such phosphorus compounds may be deposited on the catalyst, and adhere to the periphery of precious metals such as platinum (Pt), palladium (Pd), and rhodium (Rh), which are catalytically active components contained in the catalyst. In this case, the adhesion of the phosphorus compounds to the precious metals decreases the catalytic activity of the precious metals. This phenomenon is called phosphorus poisoning of the catalyst. In addition, when the phosphorus compounds in the exhaust gases are deposited on the exhaust gas purification catalyst, the diffusion of the exhaust gases is inhibited in the catalyst, and phosphorus poisoning occurs in an oxygen storage/release substance (also referred to as "oxygen storage material") contained in the catalyst. In other words, cerium oxide in the oxygen storage/release substance reacts with the phosphorus compounds to form cerium phosphate, which inhibits the storage/release of oxygen. As a method for suppressing poisoning by the sulfur oxide (SOx) instead of phosphorus, for example, Patent Literature 1 describes providing a sulfur oxide (SOx) absorption layer. However, the material described in Patent Literature 1 may not be able to suppress phosphorus poisoning.

Accordingly, an object of the present invention is to provide an exhaust gas purification catalyst that suppresses phosphorus poisoning of the exhaust gas purification catalyst and improves long-term durability.

Means for Solving Problem

A first aspect of the present invention proposes an exhaust gas purification catalyst including a phosphorus collection layer and a catalyst layer containing at least one precious metal element $M^P$ selected from the group consisting of Pt, Pd, and Rh, wherein the phosphorus collection layer is arranged on the upper layer side and/or the upstream side with respect to the catalyst layer;

the phosphorus collection layer contains a composite oxide containing Al and an alkaline earth metal element $M^a$ that includes Mg and that may include at least one selected from the group consisting of Ca, Sr, and Ba, and having a cubic spinel structure belonging to the space group Fd-3m (space group No. 227 of the International Tables of Crystallography);

the composite oxide has a molar ratio ($M^a$/Al molar ratio) of the $M^a$ element to the Al element in a range of 0.02 or more and 0.60 or less; and the composite oxide has a peak derived from the cubic spinel structure belonging to the space group Fd-3m of the composite oxide between a diffraction angle $2\theta x_{M^aO}$ that is a position of a peak derived from an alkaline earth metal oxide $M^aO$ containing the alkaline earth metal element $M^a$ and a diffraction angle $2\theta x_{Al_2O_3}$ that is a position of a peak derived from an aluminum oxide $Al_2O_3$ in an X-ray diffraction spectrum of the composite oxide.

Effect of the Invention

The exhaust gas purification catalyst proposed by the present invention includes a phosphorus collection layer containing a composite oxide having a cubic spinel structure belonging to the space group Fd-3m on the upper layer side and/or the upstream side with respect to a catalyst layer containing precious metal elements, resulting in providing an exhaust gas purification catalyst capable of suppressing phosphorus poisoning of the catalyst layer and improving the long-term durability.

MODE(S) FOR CARRYING OUT THE INVENTION

Next, the present invention will be described based on exemplary embodiments. However, the present invention is not limited to the embodiments described below.

The exhaust gas purification catalyst according to an example of the embodiment of the present invention includes a phosphorus collection layer and a catalyst layer containing at least one precious metal element $M^P$ selected from the group consisting of Pt, Pd, and Rh, and the phosphorus collection layer is arranged on the upper layer side and/or the upstream side with respect to the catalyst layer.

(Phosphorus Collection Layer)

The phosphorus collection layer contains a composite oxide containing Al and an alkaline earth metal element $M^a$ that includes Mg and that may include at least one selected from the group consisting of Ca, Sr, and Ba, and having a cubic spinel structure belonging to the space group Fd-3m, in which the composite oxide has a molar ratio ($M^a$/Al molar ratio) of the $M^a$ element to the Al element in a range of 0.02 or more and 0.60 or less, and the composite oxide has a peak derived from the cubic spinel structure belonging to the space group Fd-3m of the composite oxide between a diffraction angle $2\theta x_{M^a O}$ that is a position of a peak derived from an alkaline earth metal oxide $M^a O$ containing the alkaline earth metal element $M^a$ and a diffraction angle $2\theta x_{Al2O3}$ that is a position of a peak derived from an aluminum oxide $Al_2O_3$ in an X-ray diffraction spectrum of the composite oxide.

Since the phosphorus collection layer contains a composite oxide having a cubic spinel structure belonging to the space group Fd-3m, the composite oxide adsorbs phosphorus compounds contained in the exhaust gas, and phosphorus poisoning of the catalyst layer present on the lower layer side and/or the downstream side with respect to the phosphorus collection layer can be suppressed. The composite oxide having a cubic spinel structure belonging to the space group Fd-3m has a tetrahedral structure centered on Mg and an octahedral structure centered on Al, and thus easily absorbs phosphorus compounds (such as phosphoric acid) having a tetrahedral structure.

An oxide of the alkaline earth metal element $M^a$ such as magnesium oxide MgO has a crystal structure that is composed of an octahedral structure centered on Mg and that belongs to the space group Fm-3m (space group No. 225 of the International Tables of Crystallography). Aluminum oxide $Al_2O_3$ has a trigonal crystal structure that is composed of an octahedral structure centered on Al and that belongs to the space group R-3c (space group No. 167 of the International Tables of Crystallography). The composite oxide composed of magnesium oxide MgO and aluminum oxide $Al_2O_3$ may have a cubic crystal structure belonging to the space group Fm-3m, depending on the calcining temperature. In addition, the composite oxide composed of magnesium oxide MgO and aluminum oxide $Al_2O_3$ may have a crystal structure including both a cubic system belonging to the space group Fm-3m and a cubic system belonging to the space group Fd-3m, depending on the calcining temperature.

Even when the composite oxide has a cubic crystal structure, if it has no spinel structure, the ability to adsorb phosphorus compounds may be inferior. Further, even when the composite oxide has a cubic crystal structure, if the $M^a$/Al molar ratio is less than 0.02 or more than 0.60, the composite oxide does not have a cubic spinel structure belonging to the space group Fd-3m in an amount suitable for absorbing phosphorus compounds, and the ability to adsorb phosphorus compounds may be inferior. Hydrotalcite, which is an interlayer compound formed from a composite oxide composed of magnesium oxide MgO and aluminum oxide $Al_2O_3$, and anions, has a trigonal crystal structure belonging to the space group R-3m (space group No. 166 of the International Tables of Crystallography). Hydrotalcite is thermally unstable due to its structure, and is decomposed into magnesium oxide, aluminum oxide, and a composite oxide thereof while desorbing anions when the temperature is raised. Since hydrotalcite is thermally unstable, it may not be able to suppress phosphorus poisoning when in contact with exhaust gases.

The composite oxide contained in the phosphorus collection layer contains an alkaline earth metal element $M^a$ and Al, and has a molar ratio ($M^a$/Al molar ratio) of the $M^a$ element to the Al element in a range of 0.02 or more and 0.60 or less. When the molar ratio ($M^a$/Al molar ratio) of the alkaline earth metal element $M^a$ to the Al element in the composite oxide falls within the range of 0.02 or more and 0.60 or less, a magnesium oxide having a tetrahedral structure is formed in an aluminum oxide having an octahedral structure, and a cubic spinel structure belonging to the space group Fd-3m is likely to be formed. When the $M^a$/Al molar ratio in the composite oxide is less than 0.02 or more than 0.60, a spinel structure belonging to the space group Fd-3m is less likely to be formed. The $M^a$/Al molar ratio in the composite oxide contained in the phosphorus collection layer is preferably in a range of 0.03 or more and 0.58 or less, and more preferably in a range of 0.05 or more and 0.55 or less. The Me/Al molar ratio in the composite oxide contained in the phosphorus collection layer can be determined by measuring the amounts of alkaline earth metal element $M^a$ and Al in the composite oxide or oxide using a scanning fluorescent X-ray spectrometer (such as model number: ZSX Primus II, manufactured by Rigaku Corporation), and calculating from the obtained amounts of $M^a$ and Al. In the case where the exhaust gas purification catalyst has a plurality of layers including a phosphorus collection layer, the cross section of the portion where each layer is formed in the exhaust gas purification catalyst is observed using a scanning electron microscope (such as model number: JEM-ARM200F, manufactured by JEOL Ltd.) and analyzed using an electron beam microanalyzer (such as model number: JXA-8800R, manufactured by JEOL Ltd.), and the presence ratio of the $M^a$ element in each layer can be then detected to identify the phosphorus collection layer contained in the composite oxide. After identifying the phosphorus collection layer, the $M^a$/Al molar ratio in the composite oxide contained in the phosphorus collection layer can be determined by the method described above.

The alkaline earth metal element $M^a$ contains Mg, and may contain at least one element selected from the group consisting of Ca, Sr, and Ba, in addition to Mg. The alkaline earth metal element $M^a$ may contain only Mg, and the alkaline earth metal element $M^a$ may be Mg. When the alkaline earth metal element $M^a$ contains, in addition to Mg, at least one element selected from the group consisting of Ca, Sr, and Ba, a cubic spinel structure belonging to the space group Fd-3m of the composite oxide is likely to be formed. When the alkaline earth metal element $M^a$ in the composite oxide contains Mg and at least one element selected from the group consisting of Ca, Sr, and Ba other than Mg, the content of this element is preferably small compared to the content of Mg. For example, when the alkaline earth metal element $M^a$ contains Mg and at least one element selected from the group consisting of Ca, Sr, and Ba other than Mg, the content of the alkaline earth metal elements other than Mg is preferably 10 atm % or less in terms of an elemental composition percentage relative to the total amount of Mg and the alkaline earth metal element other than Mg contained in the composite oxide. Specifically, when the alkaline earth metal element $M^a$ contains Mg and an alkaline earth metal element other than Mg, the content of the alkaline earth metal element other than Mg is preferably 10 atm % or less in terms of an elemental composition percentage represented by "alkaline earth metal element other than Mg/(Mg+alkaline earth metal element other than Mg)" in the composite oxide. However, the content of the alkaline metal element other than Mg contained in the alkaline earth metal element $M^a$ may be more than 10 atm % as long as the cubic spinel structure belonging to the space group Fd-3m of the composite oxide can be maintained. When the alkaline earth metal element $M^a$ contains Mg and an alkaline earth metal element other than Mg, and contains two or more elements, $M^a$ in the molar ratio ($M^a$/Al molar ratio) refers to the total amount of all elements constituting the $M^a$ element.

Whether or not the composite oxide contained in the phosphorus collection layer has a cubic spinel structure belonging to the space group Fd-3m can be confirmed by an X-ray diffraction spectrum. When the composite oxide has a peak between a diffraction angle $2\theta x_{M^a O}$ that is a position of a peak derived from an alkaline earth metal oxide $M^aO$ and a diffraction angle $2\theta x_{Al2O3}$ that is a position of a peak derived from an aluminum oxide $Al_2O_3$ in the X-ray diffraction spectrum, it can be confirmed that the composite oxide has a cubic spinel structure belonging to the space group Fd-3m. The diffraction angle at which a peak derived from the cubic spinel structure belonging to the space group Fd-3m of the composite oxide appears is also referred to as a diffraction angle $2\theta x_s$. The composite oxide contained in the phosphorus collection layer is not required to have all of the above-mentioned three peaks derived from MaO, $Al_2O_3$, and the cubic spinel structure, and may have at least the peak derived from the cubic spinel structure. The peak derived from the alkaline earth metal oxide $M^aO$ is present at a position where the diffraction angle 2θ is in a range of 60° to 70°, in the X-ray diffraction spectrum. The peak derived from the aluminum oxide $Al_2O_3$ is present at a position where the diffraction angle 2θ is in a range of 60° to 70° and larger than that of the peak derived from the alkaline earth metal oxide $M^aO$, in the X-ray diffraction spectrum. When the composite oxide containing an alkaline earth metal $M^a$ and Al (such as $M^aAlO_4$) has a cubic spinel structure belonging to the space group Fd-3m, a peak derived from the cubic spinel structure belonging to the space group Fd-3m appears at a diffraction angle $2\theta x_s$ between the diffraction angle $2\theta x_{M^a O}$ that is a position of the peak derived from MaO, and the diffraction angle $2\theta x_{Al2O3}$ that is a position of the peak derived from $Al_2O_3$, in the X-ray diffraction spectrum. Specifically, the peak derived from the cubic spinel structure belonging to the space group Fd-3m contained in the composite oxide containing an alkaline earth metal element $M^a$ and Al appears at a position where the diffraction angle 2θ is in a range of 60° to 70°, and also appears at a diffraction angle $2\theta x_s$, which is larger than the diffraction angle $2\theta x_{M^a O}$ that is a position of the peak derived from the alkaline earth metal oxide $M^aO$ and smaller than the diffraction angle $2\theta x_{Al2O3}$ that is a position of the peak derived from the aluminum oxide $Al_2O_3$, as measured with the same measuring apparatus, in the X-ray diffraction spectrum. The X-ray diffraction spectrum of the composite oxide contained in the phosphorus collection layer can be measured using an X-ray diffractometer (such as model number: Mini Flex 600, manufactured by Rigaku Corporation). Each value of the diffraction angle $2\theta x_{M^a O}$, the diffraction angle $2\theta x_{Al2O3}$, and the diffraction angle $2\theta x_s$ may change depending on the measurement conditions of the X-ray diffraction spectrum. Even when the measurement conditions of the X-ray diffraction spectrum are changed, if the diffraction angle $2\theta x_s$ that is a position of the peak derived from the cubic spinel structure belonging to the space group Fd-3m contained in the composite oxide is in a range of the diffraction angle $2\theta x_{M^a O}$ and the diffraction angle $2\theta x_{Al2O3}$, the composite oxide has a cubic spinel structure belonging to the space group Fd-3m. The composite oxide as a whole is not required to have a cubic spinel structure belonging to the space group Fd-3m, and the composite oxide may have a cubic spinel structure belonging to the space group Fd-3m at least partially in a range where the $M^a$/Al molar ratio is 0.02 or more and 0.60 or less.

The composite oxide contained in the phosphorus collection layer preferably has a peak intensity ratio ($I_{M^a O}/I_s$) of an intensity $I_{M^a O}$ of the peak derived from the alkaline earth metal oxide $M^aO$ to an intensity $I_s$ of the peak derived from the cubic spinel structure belonging to the space group Fd-3m of the composite oxide being 2.0 or less in the X-ray diffraction spectrum. The phosphorus collection layer may also contain an alkaline earth metal oxide $M^aO$ together with a composite oxide having a cubic spinel structure belonging to the space group Fd-3m. Even when the phosphorus collection layer contains an alkaline earth metal oxide $M^aO$, if the peak intensity ratio ($I_{M^a O}/I_s$) is 2.0 or less, the composite oxide contains a cubic spinel structure belonging to the space group Fd-3m in an amount sufficient for absorbing phosphorus compounds contained in the exhaust gas into the phosphorus collection layer. When the phosphorus collection layer contains no alkaline earth metal oxide $M^aO$, the numerical value of the peak intensity ratio ($I_{M^a O}/I_s$) may be zero.

The phosphorus collection layer preferably contains substantially no precious metal. In the present specification, "the phosphorus collection layer contains substantially no precious metal" means that the content of the precious metal is less than 1.0 g/ft$^3$ (0.035 g/L) relative to the total amount of the phosphorus collection layer, and that the content of the precious metal in the phosphorus collection layer may be 0.1 g/ft$^3$ (0.0035 g/L) or less. The phosphorus collection layer may contain a precious metal due to the migration of the precious metal element $M^p$ contained in the catalyst layer. However, when the content of the precious metal is less than 1.0 g/ft$^3$ relative to the total amount of the phosphorus collection layer, it is assumed that the phosphorus collection layer contains substantially no precious metal. The precious metal described herein refers to at least one selected from the group consisting of Au, Ag, Pt, Pd, Rh, Ir, Ru, and Os. The amount of the precious metal contained in the phosphorus collection layer can be measured using a scanning electron microscope or an electron beam microanalyzer.

(Method for Producing Composite Oxide Having Cubic Spinel Structure)

The composite oxide having a cubic spinel structure belonging to the space group Fd-3m contained in the phosphorus collection layer can be produced by calcining a composite oxide containing an alkaline earth metal element $M^a$ and Al at a temperature of 800° C. to 1,100° C. in an atmospheric atmosphere for 1 hour or more and 6 hours or less. By calcining a composite oxide containing an alkaline earth metal element $M^a$ and Al under the conditions described above, the $M^a$/Al molar ratio can be set within a range of 0.02 or more and 0.60 or less, and a composite oxide having a cubic spinel structure belonging to the space group Fd-3m and having a tetrahedral structure centered on Mg and an octahedral structure centered on Al can be obtained. The temperature for calcining the composite oxide containing an alkaline earth metal element $M^a$ and Al serving as a raw material may be in a range of 850° C. or higher and 1,000° C. or lower. The calcination time may be 2 hours or more and 5 hours or less. The calcination atmosphere may be an atmospheric atmosphere under atmospheric pressure (0.101 MPa). The composite oxide serving as a raw material is preferably a spinel-type composite oxide containing Mg and Al. Examples of commercially available spinel-type MgAl composite oxides include PURAL (registered trademark) MG5 and PURALOX (registered trademark) MG28 manufactured by Sasol Ltd. According to the information in the catalog of Sasol Ltd., the numerical value in the product name indicates the mass % of MgO contained in the product after the product is calcined. According to the catalog, the content of magnesium (Mg) in PURAL (registered trademark) MG5 in terms of oxide (MgO) is 5% by mass when the product is calcined at 550° C. for 3 hours. The composite oxide serving as a raw material is further calcined under the conditions described above to set the $M^a$/Al molar ratio within the range of 0.02 or more and 0.60 or less, thereby obtaining a composite oxide having a cubic spinel structure belonging to the space group Fd-3m.

(Catalyst Layer)

The catalyst layer preferably contains at least one precious metal element $M^p$ selected from the group consisting of Pt, Pd, and Rh. The precious metal element $M^p$ contained in the catalyst layer may be only one selected from the group consisting of Pt, Pd, and Rh, and may contain two precious metal elements $M^p$ of Pt and Rh.

The content ratio of the precious metal element $M^p$ in the catalyst layer is preferably 1 g/ft$^3$ or more in terms of the supported amount of the precious metal element $M^p$ with respect to the apparent volume of the substrate (the volume of the outer shape of the substrate). When the content ratio of the precious metal element $M^p$ in the catalyst layer falls within the above range, harmful components such as hydrocarbons (HC), carbon monoxide (CO), and nitrogen oxides (NOx) in the exhaust gas can be purified by the action of the precious metal element $M^p$ serving as a catalytically active component.

The catalyst layer may contain a catalyst support in addition to the precious metal element $M^p$ serving as a catalytically active component. The catalyst support may be an inorganic oxide support composed of an inorganic oxide. The inorganic oxide support may be alumina ($Al_2O_3$), silica ($SiO_2$), zirconia ($ZrO_2$), ceria ($CeO_2$), niobium oxide ($Nb_2O_5$), tantalum oxide ($Ta_2O_5$), molybdenum oxide ($MoO_3$), tungsten oxide ($WO_3$), and any mixed oxide or composite oxide of these, such as a composite oxide (silica-alumina) containing silica-aluminum, a composite oxide (ceria-zirconia) containing cerium-zirconium, or a composite oxide (alumina-ceria-zirconia) containing aluminum-cerium-zirconium. The catalyst layer may contain a stabilizer, a binder, and other components as necessary, in addition to the precious metal element $M^p$ and the catalyst support. The binder may be an inorganic binder, and may be a water-soluble inorganic binder such as alumina sol.

(Exhaust Gas Purification Catalyst)

The exhaust gas purification catalyst includes a substrate, and the catalyst layer and the phosphorus collection layer are formed on the substrate.

(Substrate)

As the substrate, a known substrate for an exhaust gas purification catalyst can be used. Examples of the material of the substrate include ceramics and metals. Examples of the ceramic substrate include refractory ceramic materials such as cordierite, hydrocarbons, mullite, silica-alumina, and alumina. Examples of the metal substrate include refractory metals such as stainless steel. The shape of the substrate can be a shape having a large number of cells serving as fine flow passages parallel to the inside of the substrate, such as a honeycomb-shaped substrate. Examples of such a substrate shape include a wall-flow-type substrate and a flow-through-type substrate.

Figure 1:
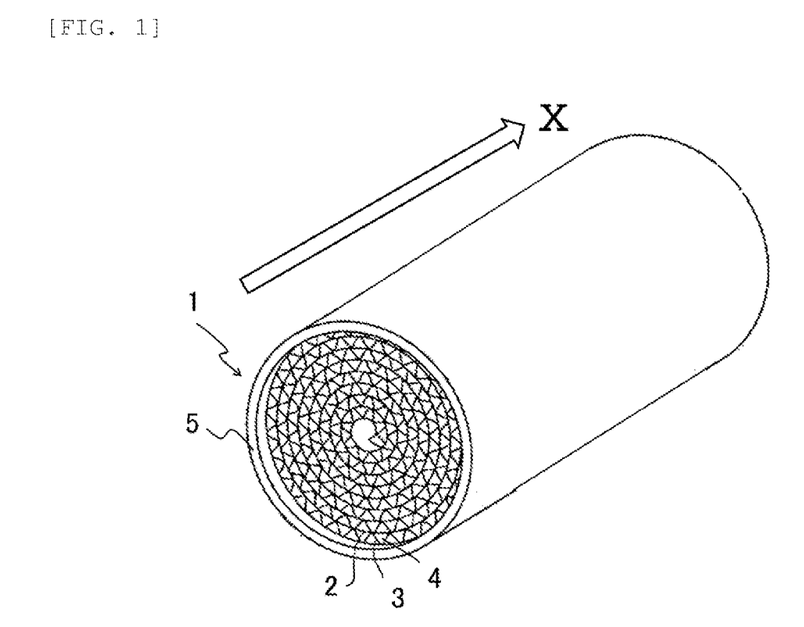
FIG. 1 is a schematic perspective view showing an example of a metal substrate.

FIG. 1 is a perspective view showing an example of the metal substrate. A metal substrate 1 may have a flat metal foil 2 and a corrugated metal foil 3 inside a mantle 5. The flat metal foil 2 and the corrugated metal foil 3 are alternately overlapped and wound in multiple layers around the axial direction to form a roll, and the outer circumference of the roll can be bonded to the inside of the mantle 5 to form the metal substrate 1. By alternately overlapping the flat metal foil 2 and the corrugated metal foil 3, fine gas flow passages, channels, or cells 4 are formed to allow fluid to circulate inside the mantle 5. The contact area between the flat metal foil 2 and the corrugated metal foil 3 may be bonded by, for example, diffusion bonding or brazing, and the contact area between the corrugated metal foil 3 or the flat metal foil 2 on the outer periphery and the mantle 5 may be bonded by brazing or the like. In FIGS. 1 to 4, X indicates the exhaust gas flow direction, and the end of the exhaust gas inflow side in the exhaust gas flow direction X and the end of the exhaust gas outflow side in the exhaust gas flow direction X are provided and both are open.

Figure 2:
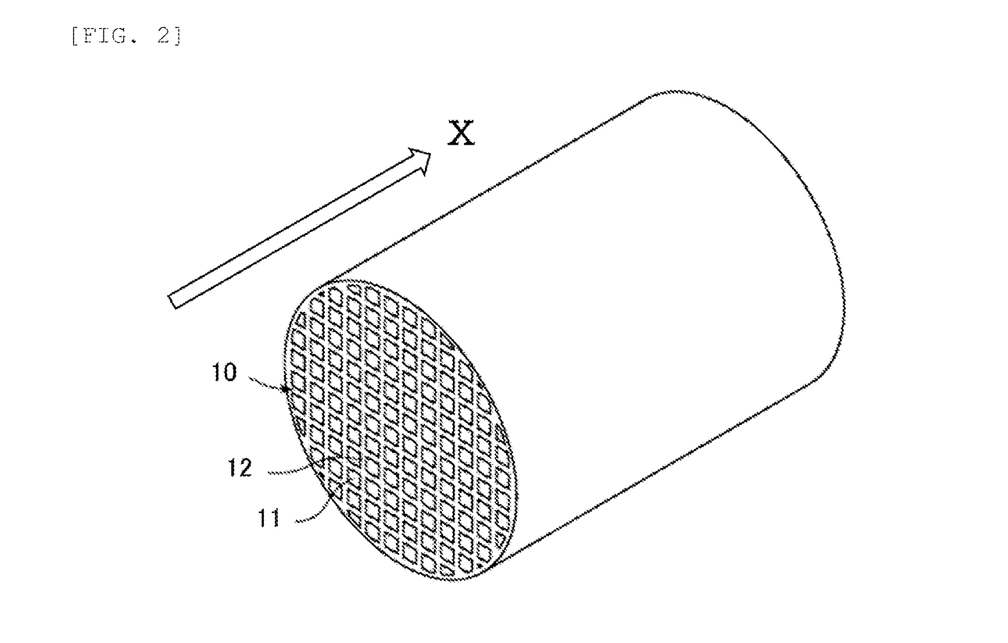
FIG. 2 is a schematic perspective view showing an example of a ceramic substrate.

FIG. 2 is a perspective view showing an example of the ceramic substrate. A ceramic substrate 10 is a flow-through-type substrate, and has a plurality of cells 11 and a partition wall portion 12 that partitions the plurality of cells 11. The substrate 10 may have a cylindrical portion that forms the outer shape of the substrate 10. The cylindrical portion is not shown in FIG. 2. The shape of the cylindrical portion may be, for example, a cylindrical shape, and may be any other shape. Examples of the other shape include an elliptic cylindrical shape and a polygonal cylindrical shape. The axial direction of the substrate 10 is the same as that of the cylindrical portion.

The phosphorus collection layer in the exhaust gas purification catalyst is arranged on the upper layer side and/or the upstream side with respect to the catalyst layer. The phosphorus collection layer is preferably arranged at a position that comes into contact with the exhaust gas prior to the catalyst layer. With this arrangement, phosphorus compounds contained in the exhaust gas can be trapped in the phosphorus collection layer before the phosphorus compounds adhere to the periphery of the catalytically active component in the catalyst layer. Accordingly, the decrease of the catalytic activity due to the phosphorus compounds adhering to the periphery of the catalytically active component can be suppressed, and the reaction with components (such as cerium) that is likely to be reacted with the phosphorus compounds contained in the catalyst layer can be also suppressed. Phosphorus poisoning can be suppressed, and the long-term durability of the exhaust gas purification catalyst can be improved. The position where the phosphorus collection layer comes into contact with the exhaust gas prior to the catalyst layer means a position where the phosphorus collection layer is arranged on the upper layer side and/or the upstream side with respect to the catalyst layer. This arrangement allows the exhaust gas to come into contact with the phosphorus collection layer at a time prior to the catalyst layer.

Figure 3:
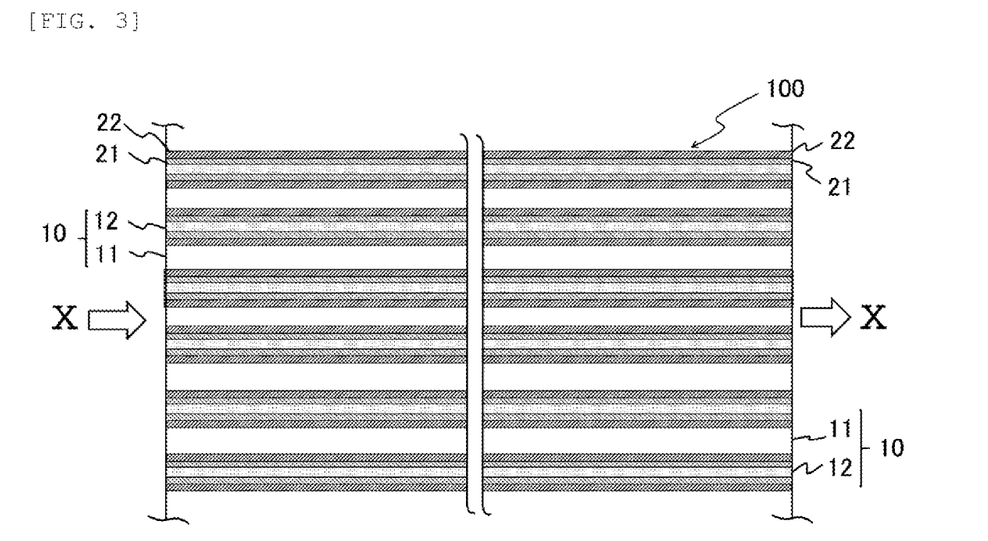
FIG. 3 shows a first embodiment of the exhaust gas purification catalyst according to the present invention, which is a partial cross-sectional view of the catalyst cut in a direction parallel to the axial direction of the substrate (the same direction as the exhaust gas flow direction).

The embodiment in which the phosphorus collection layer is arranged at a position that comes into contact with the exhaust gases prior to the catalyst layer can be an embodiment shown in FIG. 3. FIG. 3 shows a first embodiment of the exhaust gas purification catalyst, which is a partial cross-sectional view of the catalyst cut in a direction parallel to the axial direction of the substrate (the same direction as the exhaust gas flow direction). An exhaust gas purification catalyst 100 preferably has a catalyst layer 21 arranged on the side of a partition wall portion 12 of a substrate 10, and a phosphorus collection layer 22 arranged on the catalyst layer 21. By arranging the phosphorus collection layer 22 on the catalyst layer 21, phosphorus compounds contained in the exhaust gas can be trapped by the phosphorus collection layer 22 to suppress phosphorus poisoning of the catalyst layer 21, thereby improving the long-term durability of the exhaust gas purification catalyst.

Figure 4:
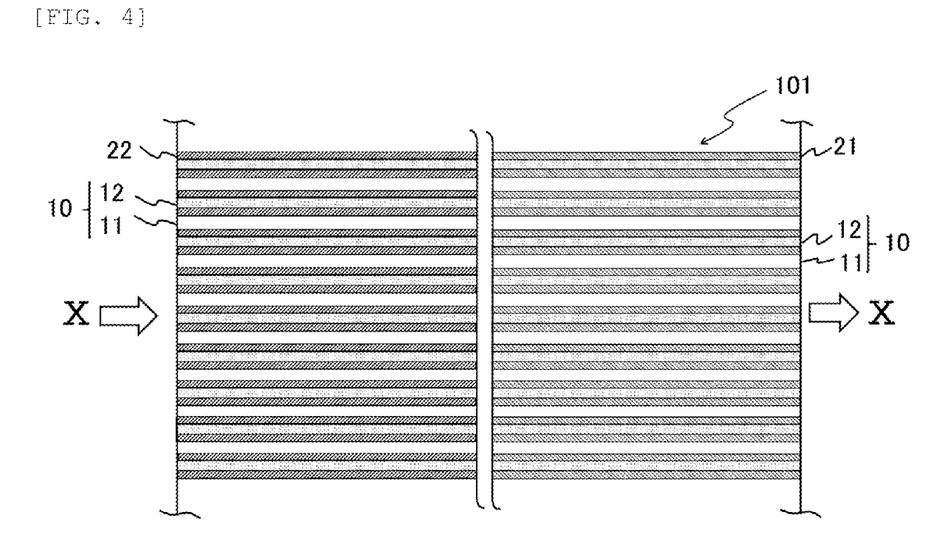
FIG. 4 shows a second embodiment of the exhaust gas purification catalyst according to the present invention, which is a partial cross-sectional view of the catalyst cut in a direction parallel to the axial direction of the substrate (the same direction as the exhaust gas flow direction).

The embodiment in which the phosphorus collection layer is arranged at a position that comes into contact with the exhaust gas prior to the catalyst layer may also be an embodiment shown in FIG. 4. FIG. 4 shows a second embodiment of the exhaust gas purification catalyst, which is a partial cross-sectional view of the catalyst cut in a direction parallel to the axial direction of the substrate (the same direction as the exhaust gas flow direction). An exhaust gas purification catalyst 101 may have a phosphorus collection layer 22 arranged on a partition wall portion 12 on the upstream side in the exhaust gas flow direction X, that is, on the exhaust gas inflow side in the exhaust gas flow direction X, and a catalyst layer 21 arranged on the downstream side in the exhaust gas flow direction X, that is, on the exhaust gas outflow side in the exhaust gas flow direction X. By arranging the phosphorus collection layer 22 on the upstream side in the exhaust gas flow direction X, phosphorus compounds contained in the exhaust gas can be trapped by the phosphorus collection layer 22 before the exhaust gas comes into contact with the catalyst layer 21, to suppress phosphorus poisoning of the catalyst layer 21 arranged on the downstream side, thereby improving the long-term durability of the exhaust gas purification catalyst. FIG. 4 shows an example in which the phosphorus collection layer 22 and the catalyst layer 21 are formed on one substrate 10. However, the phosphorus collection layer and the catalyst layer may be arranged on different substrates, respectively. For example, a first catalyst having a phosphorus collection layer arranged on a first substrate may be arranged on the upstream side, and a second catalyst having a catalyst layer arranged on a second substrate may be arranged on the downstream side.

Method for Producing Exhaust Gas Purification Catalyst

As shown in, for example, FIG. 3, in the case where the catalyst layer is arranged on the substrate side and the phosphorus collection layer is arranged on the catalyst layer, a slurried catalyst layer composition and a slurried phosphorus collection layer composition, as described later, can be coated in this order on the surface forming exhaust gas flow passages, that is, on the entire surface of the inner wall of each cell (after coating each slurry, drying and calcining may be performed as necessary), to thereby produce an exhaust gas purification catalyst having a catalyst layer arranged on the substrate side and a phosphorus collection layer arranged on the catalyst layer.

As shown in, for example, FIG. 4, in the case where the phosphorus collection layer is arranged on the upstream side in the exhaust gas flow direction, that is, on one side of the substrate in the exhaust gas inflow direction, and the catalyst layer is arranged on the downstream side in the exhaust gas flow direction, that is, on one side of substrate in the exhaust gas outflow direction, a slurried phosphorus collection layer composition may be adhered to an area of 40% to 60% of the total length of the substrate and dried to form a phosphorus collection layer. Then, a slurried catalyst layer composition may be adhered to an area of 40% to 60% of the total length of the substrate on the other side of the substrate that is the downstream side in the exhaust gas flow direction and dried to form a catalyst layer. By adhering each slurried composition to the substrate, drying, and then calcining each composition, an exhaust gas purification catalyst, in which the phosphorus collection layer is arranged on the upstream side in the exhaust gas flow direction and the catalyst layer is arranged on the downstream side in the exhaust gas flow direction, can be produced.

The catalyst layer can be formed by preparing a slurried catalyst layer composition, coating the slurried catalyst layer composition on a substrate, drying as necessary, and calcining. The catalyst layer composition can be produced by mixing and stirring a precious metal element $M^p$ serving as a catalytically active component, a catalyst support, and optionally a stabilizer, a binder, water, and other components.

The phosphorus collection layer can be formed by pulverizing a composite oxide having a cubic spinel structure belonging to the space group Fd-3m as necessary, mixing the composite oxide with water to prepare a slurried phosphorus collection layer composition, coating the slurried phosphorus collection layer composition on the catalyst layer, drying as necessary, and calcining. The composite oxide having a cubic spinel structure belonging to the space group Fd-3m can be pulverized using, for example, a ball mill. The composite oxide can be pulverized such that the average particle diameter D50 at which the cumulative frequency from the small diameter side reaches 50% in the volume-based particle size distribution by the laser diffraction scattering method is in a range of 10 to 30 μm. The particle diameter of the composite oxide can be classified into specific sizes by, for example, sieving.

The viscosity of each slurried composition is not particularly limited as long as the slurried composition can be coated on a substrate. From the viewpoint of facilitating coating, the viscosity of each slurried composition can be prepared to, for example, 5,000 cp or more and 40,000 cp or less, preferably 5,000 cp or more or 35,000 cp or less, and more preferably 5,000 cp or more or 30,000 cp or less.

The drying temperature after coating each slurried composition on a substrate is, for example, 80° C. or higher and 200° C. or lower, and preferably 100° C. or higher and 150° C. or lower.

The calcining temperature after coating each slurried composition on a substrate and drying may be higher than 200° C. and 600° C. or lower, and may be 300° C. or higher and 500° C. or lower.

The method for producing an exhaust gas purification catalyst may employ any known method, and is not limited to the above-mentioned examples.

For example, the exhaust gas purification catalyst may have two honeycomb bodies arranged side by side on the upstream side and the downstream side of the exhaust gas at a certain interval in a metal mantle. A honeycomb-shaped exhaust gas purification catalyst may be arranged in an exhaust pipe or a muffler, which is an mantle.

EXAMPLES

Hereinafter, the present invention will be described in more detail with reference to Examples and Comparative Examples. The present invention is not limited to these Examples.

Example 1

Method for Producing Composite Oxide Having Cubic Spinel Structure Belonging to Space Group Fd-3m Spinel-type 5MgO-95Al$_2$O$_3$ (PURAL (registered trademark) MG5, manufactured by Sasol Ltd.) serving as a composite oxide raw material was calcined at 950° C. for 4 hours at atmospheric pressure in an atmospheric atmosphere to produce a composite oxide having a cubic spinel structure belonging to the space group Fd-3m (the composition of the composite oxide was represented by Mg$_{0.2}$Al$_{2.7}$O$_x$, and x in the composition represented the number of oxygen determined according to the ratio of Mg and Al). Whether or not the resulting composite oxide had a cubic spinel structure belonging to the space group Fd-3m was confirmed by the measurement method described later. In each of Examples and Comparative Examples, the content (catalog value) of magnesium (Mg) in the composite oxide serving as a raw material in terms of oxide (MgO) is shown in Table 1.

Preparation of Catalyst Layer Composition

A platinum aqueous solution in an amount of 0.4% by mass (in terms of Pt metal), a rhodium nitrate aqueous solution in an amount of 0.3% by mass (in terms of Rh metal), a cerium-zirconium composite oxide in an amount of 70% by mass, and alumina as the balance were mixed to prepare a slurried catalyst layer composition.

Production of Catalyst Layer

As a metal substrate, a stainless metal honeycomb support (300 cells/inch$^2$, φ43 mm×L100 mm, thickness of metal foil of 80 μm) including a mantle, a flat metal foil, and a corrugated metal foil was prepared. The metal substrate was immersed in the above-mentioned slurried catalyst layer composition, excess slurry in the cells of the substrate was removed by air blow, and the resulting metal substrate was dried and then calcined at 450° C. for 1 hour in an atmospheric atmosphere to form a catalyst layer on the entire inner wall of the cells. The solid content of the slurried catalyst layer composition adhering to the substrate was 100 g per 1 L of the volume of the substrate (the volume of the substrate outline) (100 g/L).

Preparation of Phosphorus Collection Layer Composition

The composite oxide having a cubic spinel structure belonging to the space group Fd-3m in an amount of 400 g was dispersed in 600 L of water (deionized water), and pulverized using a ball mill, such that the average particle diameter D50 at which the cumulative frequency from the small diameter side reached 50% in the volume-based particle size distribution measured by the laser diffraction scattering method was 20 μm, thereby obtaining a slurried phosphorus collection layer composition.

Production of Phosphorus Collection Layer

The substrate on which the catalyst layer was formed was immersed in the above-mentioned slurried phosphorus collection layer composition, excess slurry in the cells of the substrate was removed by air blow, and the resulting substrate was dried and then calcined at 450° C. for 1 hour in an atmospheric atmosphere to form a phosphorus collection layer on the entire inner wall of the cells, thereby producing an exhaust gas purification catalyst having the catalyst layer arranged on the substrate side and the phosphorus collection layer arranged on the catalyst layer. The solid content of the slurried phosphorus collection layer composition adhering to the substrate was 80 g per 1 L of the volume of the substrate (the volume of the substrate outline) (80 g/L).

Examples 2 to 4

Exhaust gas purification catalysts were produced in the same manner as in Example 1 except that, instead of PURAL (registered trademark) MG5 serving as a composite oxide raw material, PURAL (registered trademark) MG20 (the composition was Mg$_{0.7}$Al$_{2.3}$O$_x$) was used in Example 2, PURALOX (registered trademark) MG28 (the composition was Mg$_{1.0}$Al$_{2.0}$O$_x$) was used in Example 3, and PURAL (registered trademark) MG30 (the composition was Mg$_{1.1}$Al$_{2.0}$O$_x$) was used in Example 4, respectively.

Comparative Example 1

An exhaust gas purification catalyst was produced in the same manner as in Example 1 except that no phosphorus collection layer was formed (that is, only the catalyst layer was formed on the substrate).

Comparative Example 2

An exhaust gas purification catalyst was produced in the same manner as in Example 1 except that hydrotalcite (PURAL (registered trademark) MG70, manufactured by Sasol Ltd.) having a composition of Mg$_{70}$Al$_{30}$O$_x$ was used instead of PURAL (registered trademark) MG5 serving as a composite oxide raw material, and the calcining temperature was changed to 750° C.

Comparative Example 3

An exhaust gas purification catalyst was produced in the same manner as in Example 1 except that hydrotalcite (PURAL (registered trademark) MG70, manufactured by Sasol Ltd.) having a composition of Mg$_{70}$Al$_{30}$O$_x$ was used instead of PURAL (registered trademark) MG5 serving as a composite oxide raw material, and the calcining temperature was changed to 950° C.

Comparative Example 4

An exhaust gas purification catalyst was produced in the same manner as in Example 1 except that magnesium oxide (MgO) (product name: magnesium hydroxide, manufactured by Fujifilm Wako Pure Chemical Corporation, was calcined at 450° C. to form magnesium oxide) was used instead of the composite oxide raw material.

Comparative Example 5

An exhaust gas purification catalyst was produced in the same manner as in Example 1 except that aluminum oxide (Al$_2$O$_3$) (product name: G850S, manufactured by PIDC) was used instead of the composite oxide raw material.

Comparative Example 6

An exhaust gas purification catalyst was produced in the same manner as in Example 1 except that a mixture obtained by mixing magnesium oxide used in Comparative Example 4 and aluminum oxide used in Comparative Example 5 at a mass ratio of 28:72 was used instead of the composite oxide raw material.

Comparative Example 7

An exhaust gas purification catalyst was produced in the same manner as in Example 1 except that silicon dioxide ($SiO_2$) (product name: LUDOX AS-40, manufactured by Sigma-Aldrich Co. LLC) was used instead of the composite oxide raw material.

The following measurements were performed on the composite oxide or oxide used in the phosphorus collection layer in each of Examples and Comparative examples.

$M^a$/Al Molar Ratio

The amount of alkaline earth metal element $M^a$ (specifically Mg) and the amount of Al in the composite oxide or oxide were measured using a scanning fluorescent X-ray spectrometer (model number: ZSX Primus II, manufactured by Rigaku Corporation), and the $M^a$/Al molar ratio was calculated from the obtained amounts of $M^a$ and Al. The method for preparing a measurement sample was as follows.

Method for Preparing Measurement Sample

The composite oxide or oxide was packed in a vinyl chloride tube having a diameter of 30 mm, and compression-molded to prepare a measurement sample.

Specific Surface Area

The specific surface area was calculated by the BET method from the nitrogen adsorption isotherm measured in accordance with ISO 9277:2010.

Basic Point

The measurement was performed using a gas adsorption/desorption measurement apparatus (model number: BEL-CAT, manufactured by MicrotracBEL Corporation, and model number: BELMASS, manufactured by Microtrac-BEL Corporation). A powder of the composite oxide or inorganic oxide in an amount of 100 mg was filled into a dedicated measurement cell and then introduced into the apparatus, and degassed at 600° C. for 1 hour under a helium (He) air flow. Subsequently, the resulting product was allowed to cool to 100° C. and to adsorb carbon dioxide ($CO_2$), which was an acid probe molecule, for 10 minutes, purged under a helium (He) air flow, and the temperature rise measurement was then performed. In this case, the amount of desorbed $CO_2$ was quantified by measuring the mass number 44 of a quadrupole mass spectrometer, and the amount of basic point was calculated assuming that the ratio of the amount of desorbed $CO_2$ to the amount of basic point was 1.

X-Ray Diffraction Spectrum

Figure 5:
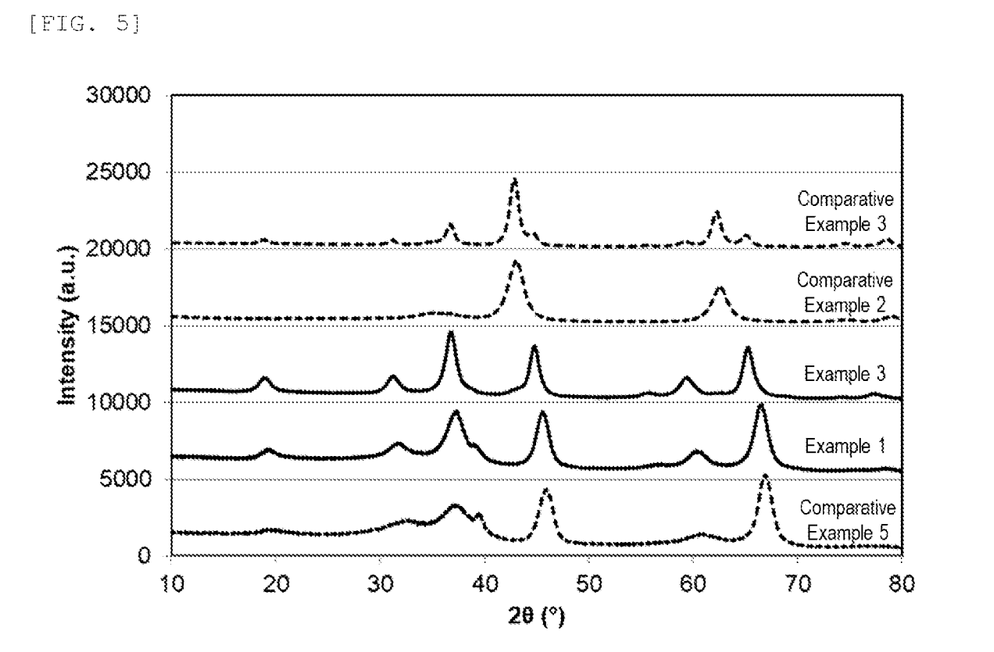
FIG. 5 is a graph showing X-ray diffraction spectra of oxides or composite oxides contained in phosphorus collection layers in Examples and Comparative Examples.

The X-ray diffraction spectrum of the composite oxide or oxide contained in each phosphorus collection layer composition was measured using an X-ray diffractometer (model number: Mini Flex 600, manufactured by Rigaku Corporation). FIG. 5 shows X-ray diffraction spectra of the oxide ($Al_2O_3$) contained in the phosphorus collection layer composition in Comparative Example 5 and the composite oxides contained in the phosphorus collection layer compositions in Examples 1 and 3 and Comparative Examples 2 and 3.

The following measurements were performed on the exhaust gas purification catalyst in each of Examples and Comparative Examples.

Phosphorus Poisoning Test (Durability Test)

The phosphorus poisoning test was performed using an engine bench system. Commercially available regular gasoline was mixed with engine oil (containing zinc dialkyldithiophosphate), and the gasoline was burned in the engine to generate an exhaust gas containing phosphorus compounds. The exhaust gas was passed through the exhaust gas purification catalyst located behind the engine in the gas flow direction, and controlled such that 0.3 g of the phosphorus compounds (in terms of phosphorus element) per catalyst was introduced, thereby performing a durability test.

Purification performance after the phosphorus poisoning test was evaluated by a motorcycle exhaust gas test. A test motorcycle (125 cc scooter) having a gas detector installed at the exhaust gas outlet was run in accordance with the Worldwide-harmonized Motorcycle Test Cycle (WMTC) mode test method (Class-1), and the components in the exhaust gas that passed through the exhaust gas purification catalyst in each of Examples and Comparative Examples were quantified. The quantification was performed focusing on nitrogen oxides (NOx) which were causative substances of environmental pollution such as acid rain, as an index for evaluating the purification performance. From the obtained quantitative value, the quantitative ratio was calculated when the quantitative value in the exhaust gas that passed through the exhaust gas purification catalyst in Comparative Example 1 having no phosphorus collection layer was set to 1 (reference). The results are shown in Table 1. In Table 1, the calculated quantitative ratio is indicated as purification performance (%).

TABLE 1

| | Oxide of composite oxide contained in phosphorus collection layer | Space group Crystal structure | Mg content (% by mass) in terms of MgO | $M^a$/Al molar ratio | Specific surface area ($m^2$/g) | Basic point (mmol/g) | XRD 2θ = 60° to 70° peak diffraction angle | 2θ = 60° to 70° peak derived | 2θ = 60° to 70° $l_{M^a o}/l_s$ peak intensity ratio | Purification performance (%) |
|---|---|---|---|---|---|---|---|---|---|---|
| Example 1 | $Mg_{0.2}Al_{2.7}O_x$ | Fd-3m cubic spinel | 5 | 0.07 | 140 | 0.02 | 66.4 | spinel | 0.0 | 0.89 |
| Example 2 | $Mg_{0.7}Al_{2.3}O_x$ | Fd-3m cubic spinel | 20 | 0.30 | 108 | 0.04 | 65.3 | spinel | 0.0 | 0.95 |
| Example 3 | $Mg_{1.0}Al_{2.0}O_x$ | Fd-3m cubic spinel | 28 | 0.50 | 103 | 0.12 | 65.2 | spinel | 0.0 | 0.86 |
| Example 4 | $Mg_{1.1}Al_{2.0}O_x$ | Fd-3m cubic spinel | 30 | 0.55 | 77 | 0.11 | 65.2 | spinel | 0.0 | 0.98 |

TABLE 1-continued

| | Oxide of composite oxide contained in phosphorus collection layer | Space group Crystal structure | Mg content (% by mass) in terms of MgO | $M^a$/Al molar ratio | Specific surface area ($m^2/g$) | Basic point (mmol/g) | XRD $2\theta = 60°$ to $70°$ peak diffraction angle | $2\theta = 60°$ to $70°$ peak derived | $2\theta = 60°$ to $70°$ $I_{M^a o}/I_s$ peak intensity ratio | Purification performance (%) |
|---|---|---|---|---|---|---|---|---|---|---|
| Comparative Example 1 | no phosphorus collection layer | — | — | — | — | — | — | — | — | 1 (ref) |
| Comparative Example 2 | $Mg_{70}Al_{30}O_x$ 750° C. | Fm-3m cubic system | 70 | 2.33 | 75 | 0.09 | 62.6 | MgO | — | 1.1 |
| Comparative Example 3 | $Mg_{70}Al_{30}O_x$ 950° C. | Fm-3m + Fd-3m cubic system | 70 | 2.33 | 75 | 0.28 | 62.2, 65.1 | MgO, spinel | 3.3 | 1.1 |
| Comparative Example 4 | MgO | Fm-3m cubic system | 100 | — | 113 | 1.06 | — | — | — | 1.06 |
| Comparative Example 5 | $Al_2O_3$ | R-3c trigonal system | 0 | — | 151 | 0.01 | 66.8 | $Al_2O_3$ | — | 1.02 |
| Comparative Example 6 | $MgO + Al_2O_3$ (28:72) | — | 28 | — | 139 | 0.30 | — | — | — | 1.35 |
| Comparative Example 7 | $SiO_2$ | — | 0 | — | — | — | — | — | — | 1.05 |

As shown in Table 1, the composite oxides contained in the phosphorus collection layers in Examples 1 to 4 had a cubic spinel structure belonging to the space group Fd-3m, and had a $M^a$/Al molar ratio in the range of 0.02 or more and 0.60 or less. As shown in Table 1 and FIG. 5, the composite oxides in Examples 1 to 4 had the following peaks in the X-ray diffraction spectra. The composite oxide represented by $Mg_{0.2}Al_{2.7}O_x$ contained in the phosphorus collection layer in Example 1 had a peak derived from the cubic spinel structure belonging to the space group Fd-3m at a diffraction angle $2\theta_s$ of 66.4° in the X-ray diffraction spectrum. The composite oxide represented by $Mg_{0.7}Al_{2.3}O_x$ contained in the phosphorus collection layer in Example 2 had a peak derived from the cubic spinel structure belonging to the space group Fd-3m at a diffraction angle $2\theta_s$ of 65.3° in the X-ray diffraction spectrum. The composite oxides represented by $Mg_{1.0}Al_{2.0}O_x$ and $Mg_{1.1}Al_{2.0}O_x$, respectively, contained in the phosphorus collection layers in Examples 3 and 4 had a peak derived from the cubic spinel structure belonging to the space group Fd-3m at a diffraction angle $2\theta_s$ of 65.2° in the X-ray diffraction spectrum. All of the composite oxides in Examples 1 to 4 had a peak between a diffraction angle $2\theta_{M^a O}$ of 62.6° that was a position of the peak derived from the alkaline earth metal oxide ($M^a O$=MgO) in Comparative Example 2 and a diffraction angle $2\theta_{Al2O3}$ of 66.8° that was a position of the peak derived from the aluminum oxide ($Al_2O_3$) in Comparative Example 5 in the X-ray diffraction spectra, and from the presence of the peak, it was confirmed that the composite oxides had a cubic spinel structure belonging to the space group Fd-3m.

As shown in Table 1 and FIG. 5, in Comparative Examples 2, 3, and 5, the following peaks were observed in the X-ray diffraction spectra. In the X-ray diffraction spectrum of the composite oxide contained in the phosphorus collection layer in Comparative Example 2, a peak derived from the cubic system of MgO ($M^a O$) appeared at a diffraction angle $2\theta_{M^a O}$ of 62.6°. In the composite oxide contained in the phosphorus collection layer in Comparative Example 3, a peak derived from the cubic system of MgO ($M^a O$) appeared at a diffraction angle $2\theta_{M^a O}$ of 62.2°, and a peak derived from the cubic spinel structure belonging to the space group Fd-3m appeared at a diffraction angle $2\theta$ of 65.1°. The composite oxide in Comparative Example 5 partially had a cubic spinel structure belonging to the space group Fd-3m, but the $M^a$/Al molar ratio of the composite oxide was more than 0.60. It was thus presumed that the composite oxide did not have a cubic spinel structure belonging to the space group Fd-3m in an amount suitable for absorbing phosphorus compounds. The oxide contained in the phosphorus collection layer in Comparative Example 5 was $Al_2O_3$, and a peak derived from $Al_2O_3$ appeared at a diffraction angle $2\theta x_{Al2O3}$ Of 66.8°.

In the phosphorus poisoning (after durability) test, the exhaust gas purification catalysts in Examples 1 to 4 had lower quantitative values compared to the exhaust gas purification catalyst in Comparative Example 1, which had no phosphorus collection layer, resulting in that the nitrogen oxides (NOx) were purified to improve the purification performance, the phosphorus poisoning of the catalyst layer was suppressed, and the long-term durability was improved.

No correlation could be confirmed between the numerical values of the specific surface area and basic point of the oxide or composite oxide contained in the phosphorus collection layer of the exhaust gas purification catalyst in each of Examples and Comparative Examples and the purification performance result. It was confirmed that the phosphorus collection performance of the phosphorus collection layer was largely independent on the specific surface area and basic point, but was dependent on the crystal structure of the composite oxide contained in the phosphorus collection layer.

On the other hand, in the phosphorus poisoning (after durability) test of the exhaust gas purification catalysts in Comparative Examples 2 to 7, the purification performance was rather deteriorated compared to the exhaust gas purification catalyst in Comparative Example 1, which had no phosphorus collection layer, and the phosphorus poisoning of the catalyst layer could not be suppressed.

INDUSTRIAL APPLICABILITY

The exhaust gas purification composition according to the present disclosure is capable of suppressing phosphorus poisoning of the catalyst layer and improving the long-term durability. Thus, the exhaust gas purification catalyst according to the present disclosure can be suitably used for purifying exhaust gases emitted from internal-combustion engines of automatic four-wheel vehicles, motorcycles, and the like.

EXPLANATIONS OF LETTERS OR NUMERALS

1: Metal substrate, 2: Flat metal foil, 3: Corrugated metal foil, 4: Cell (or Channel), 5: Mantle, 10: Substrate, 11: Cell, 12: Partition wall portion, 21: Catalyst layer, 22: Phosphorus collection layer, 100, 101: Exhaust gas purification catalyst, and X: Exhaust gas flow direction.

The invention claimed is:

1. An exhaust gas purification catalyst comprising a phosphorus collection layer and a catalyst layer containing at least one precious metal element $M^p$ selected from the group consisting of Pt, Pd, and Rh,
    wherein the phosphorus collection layer is arranged on the upper layer side and/or the upstream side with respect to the catalyst layer;
    the phosphorus collection layer comprises a composite oxide containing Al and an alkaline earth metal element $M^a$ that includes Mg and at least one selected from the group consisting of Ca, Sr, and Ba other than Mg, and having a cubic spinel structure belonging to the space group Fd-3m;
    the composite oxide has a molar ratio ($M^a$/Al molar ratio) of the $M^a$ element to the Al element in a range of 0.02 or more and 0.60 or less;
    the composite oxide has a peak derived from the cubic spinel structure belonging to the space group Fd-3m of the composite oxide between a diffraction angle $2\theta x_{M^aO}$ that is a position of a peak derived from an alkaline earth metal oxide $M^aO$ and a diffraction angle $2\theta x_{Al2O3}$ that is a position of a peak derived from an aluminum oxide $Al_2O_3$ in an X-ray diffraction spectrum of the composite oxide; and
    the alkaline earth metal element other than Mg has a content of 10 atm % or less in terms of an elemental composition percentage relative to the total amount of Mg and the alkaline earth metal element other than Mg contained in the composite oxide.

2. The exhaust gas purification catalyst according to claim 1, wherein the phosphorus collection layer has a peak intensity ratio ($I_{M^aO}/I_s$) of an intensity $I_{M^aO}$ of the peak derived from the alkaline earth metal oxide $M^aO$ to an intensity Is of the peak derived from the cubic spinel structure belonging to the space group Fd-3m of the composite oxide being 2.0 or less in an X-ray diffraction spectrum of the composite oxide contained in the phosphorus collection layer.

3. The exhaust gas purification catalyst according to claim 1, comprising a substrate, wherein the phosphorus collection layer is arranged on the substrate at a position that comes into contact with exhaust gases prior to the catalyst layer.

4. The exhaust gas purification catalyst according to claim 1, wherein the phosphorus collection layer comprises substantially no precious metal element.

5. The exhaust gas purification catalyst according to claim 2, comprising a substrate, wherein the phosphorus collection layer is arranged on the substrate at a position that comes into contact with exhaust gases prior to the catalyst layer.

6. The exhaust gas purification catalyst according to claim 2, wherein the phosphorus collection layer comprises substantially no precious metal element.

* * * * *